Patented Dec. 25, 1951

2,579,810

UNITED STATES PATENT OFFICE 2,579,810

PROCESS OF PREPARING SUBSTITUTED HYDROXYMETHYLPHOSPHONIC ESTERS

Ellis K. Fields, Chicago, Ill., assignor to Research Corporation, New York, N. Y., a corporation of New York No Drawing. Application August 18, 1949, Serial No. 111,079

3 Claims. (Cl. 260—461.1)

This invention relates to novel organic phosphorus compounds and to a method of making the same. More particularly the invention deals with esters of substituted hydroxymethylphosphonic acids.

It is an object of the invention to produce novel organic compounds which are characterized by possessing in their molecules both a hydroxyl group and a phosphonic ester group.

The novel compounds of the invention have the general formula

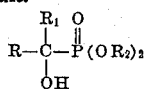

wherein R, $R_1$ and $R_2$ may be the same or different radicals including alkyl, aryl, aralkyl, cycloalkyl and heterocyclic radicals, as well as such radicals containing substituents such as halogen, nitro, amino, hydroxy, alkoxy, mercapto, carbonyl, carboxy, thiocyano, and the like; in addition, R may be hydrogen.

I have discovered that these novel compounds may be easily prepared in excellent yields by reacting carbonyl compounds (by which is meant aldehydes and ketones) with a phosphite diester (by which is meant a diester of phosphorous acid, such as diethyl phosphite). A basic catalyst is necessary to bring about reaction, for mixtures of carbonyl compound with phosphite diester may be warmed together for extended periods without any appreciable reaction. If, however, a small amount of a basic catalyst, such as the trialkylamines, for example, triethylamine and tributylamine, and alkali and alkaline earth salts of weak acids such as potassium carbonate, sodium methylate, and barium acetate, is added, the reaction proceeds readily and often with the evolution of heat to produce the hydroxyphosphonic ester as shown below:

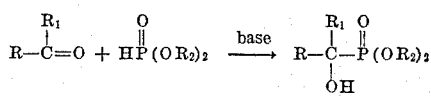

The novel esters of the invention are colorless heavy liquids of pleasant odor. They can be distilled in vacuo with little or no decomposition. The lower members are very soluble in water as well as in the common organic solvents.

In the table are listed a number of novel esters produced according to the method of the invention. It is understood that the scope of the invention is not limited to the compounds therein listed.

Table

HYDROXYMETHYLPHOSPHONIC ESTERS FROM CARBONYL COMPOUNDS AND DIETHYL PHOSPHITE

| Carbonyl Compound | Boiling Point of Product | |
|---|---|---|
| | ° C. | mm. pressure |
| Acetaldehyde | 109 | 1 |
| Propionaldehyde | 118 | 1 |
| Butyraldehyde | 126 | 1 |
| 2-ethylhexaldehyde | 146 | 1 |
| Benzaldehyde | 83 | melting point |
| Acetone | 110 | 1 |
| Acrolein | 131 | 1.5 |
| Crotonaldehyde | 140 | 1 |
| Furfural | 158 | 1 |
| Chloral | decomposes over 100° | |
| Butyraldehyde with dibutyl phosphite | 155 | 1 |

The compounds of the invention are generally useful as intermediates for resins, plasticizers for resins, pharmaceuticals, insecticides, bactericides and fungicides, and in perfume compositions. They may be esterified with organic and inorganic acids and etherified by the usual methods. They may be dehydrated to unsaturated polymerizable esters, vinyl or substituted vinyl phosphonic acid esters. For example, alpha-hydroxyethylphosphonic acid diethyl ester may be dehydrated as such or as the acetate to give vinylphosphonic acid diethyl ester, which may be polymerized to a clear, hard, fire-resistant plastic.

The esters may be hydrolyzed to the corresponding substituted phosphonic acids by hydrolysis with concentrated hydrochloric acid. For example, by refluxing alpha-hydroxybenzylphosphonic acid diethyl ester with ten parts of concentrated hydrochloric acid for one hour and evaporating on the water bath, a quantitative yield of alpha-hydroxybenzylphosphonic acid is obtained.

In the following examples, parts means parts by weight.

*Example I*

A mixture of 7.1 parts butyraldehyde, 13.8 parts diethyl phosphite and 1 part triethylamine is warmed at 75° C. for 15 minutes, then distilled, yielding 19.7 parts (94%) alpha-hydroxybutylphosphonic acid diethyl ester, boiling at 126° C. at 1 mm. pressure.

*Example II*

A mixture of 7.1 parts butyraldehyde, 19.4 parts dibutyl phosphite and 1 part triethylamine is warmed at 70° C. for 15 minutes, then distilled, yielding 24 parts (91%) alpha-hydroxybutylphosphonic acid dibutyl ester, boiling at 155° C. at 1 mm. pressure.

Example III

A mixture of 10.6 parts benzaldehyde with 13.8 parts diethyl phosphite and 1 part triethylamine is warmed at 50° for 5 minutes. The mixture then evolves considerable heat and sets to a solid mass. It is crystallized from benzene, giving 22 parts (91%) white crystals of alpha-hydroxybenzylphosphonic acid diethyl esters melting at 83° C.

I claim:

1. A process which comprises reacting a phosphite diester with a carbonyl compound in the presence of a basic catalyst of the group consisting of organic tertiary nitrogen bases and alkali and alkaline earth salts of weak acids and recovering the substituted hydroxymethylphosphonic acid diester thereby produced.

2. A process which comprises reacting a phosphite diester with an aldehyde in the presence of a basic catalyst of the group consisting of organic tertiary nitrogen bases and alkali and alkaline earth salts of weak acids and recovering the substituted hydroxymethylphosphonic acid diester thereby produced.

3. A process which comprises reacting a phosphite diester with a ketone in the presence of a basic catalyst of the group consisting of organic tertiary nitrogen bases and alkali and alkaline earth salts of weak acids and recovering the substituted hydroxymethylphosphonic acid diester thereby produced.

ELLIS K. FIELDS.

REFERENCES CITED

The following references are of record in the file of this patent:

UNITED STATES PATENTS

| Number | Name | Date |
|---|---|---|
| 2,254,124 | Stevens et al. | Aug. 26, 1941 |
| 2,286,792 | Dickey et al. | June 16, 1942 |

FOREIGN PATENTS

| Number | Country | Date |
|---|---|---|
| 552,061 | Great Britain | Mar. 22, 1943 |

OTHER REFERENCES

Marie (II), Compte Rendus, vol. 135, pp. 106–108 and 1118–1120 (1902).

Marie Annales de chim. et physique, 8th Series, vol. 3 (1904), pp. 335, 341, 406–410, and 429–431.

Page: J. Chem. Soc., vol. 101, pp. 423–431 (1912).